July 8, 1930.                J. MAYEUR, SR                    1,770,039
                              GLASS CONVEYER
                         Filed Jan. 27, 1927        2 Sheets-Sheet 1
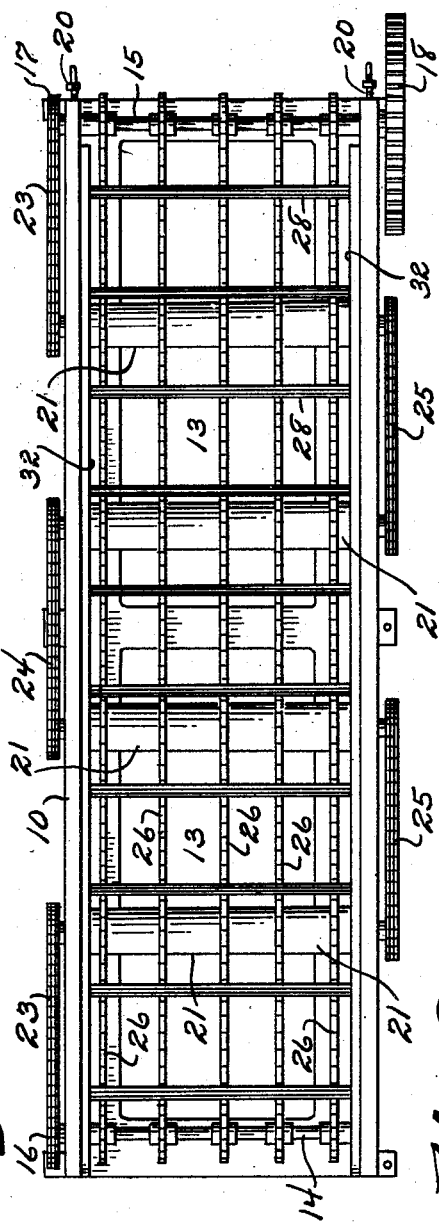
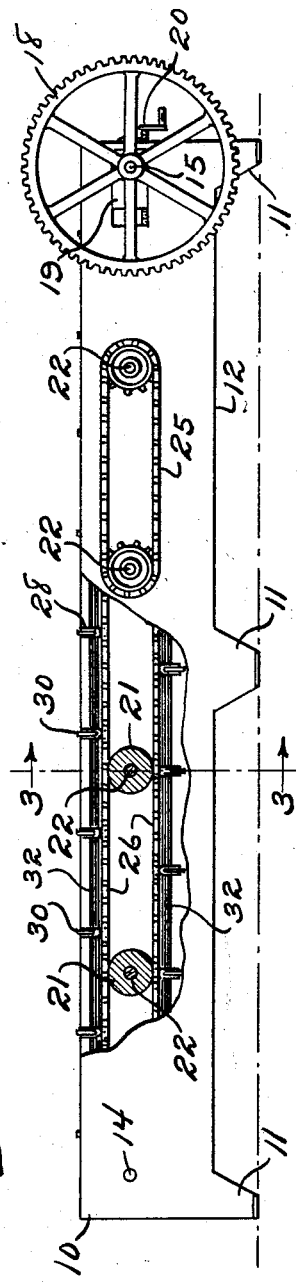
Jules Mayeur, Sr.
INVENTOR
WITNESS:

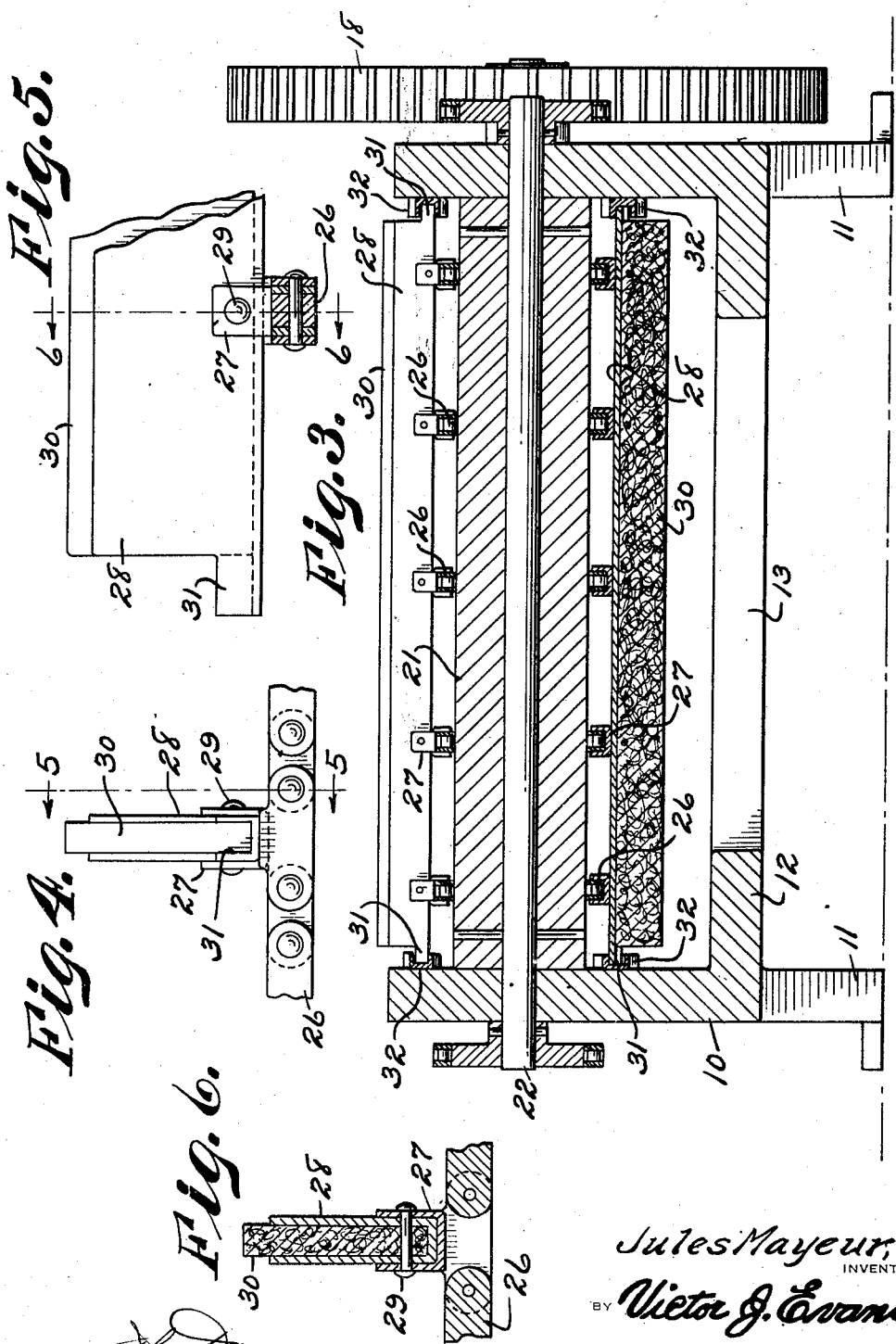

Patented July 8, 1930

1,770,039

UNITED STATES PATENT OFFICE

JULES MAYEUR, SR., OF RICHMOND, VIRGINIA, ASSIGNOR OF ONE-HALF TO CLARENCE H. GILBERT, OF RICHMOND, VIRGINIA

GLASS CONVEYER

Application filed January 27, 1927. Serial No. 164,085.

My present invention has reference to a sheet glass conveyer for conveying sheet glass from the oven.

To provide a conveyer for this purpose it is necessary that the sheet glass be received thereon in a manner that will prevent the breakage, scratching, and smearing of the glass, that the elements or parts of the conveyer on which the glass is received shall be of a heat absorbing nature, that all of such elements be sustained in proper alignment with respect to each other so as to firmly contact with the glass sheets, that the movement of such elements shall be in proper timed relation, that any slack be compensated for, that the said elements be properly guided and that the elements embody a desired yieldability. It may, therefore, be considered the primary object of this invention to provide an endless sheet glass conveyer that embodies therein the above mentioned desirable features, together with others which will appear as the nature and operation of the invention is fully set forth in the following description and pointed out with particularity in the appended claim.

The drawings which accompany and form part of this application illustrate a satisfactory embodiment of my improvement, and wherein:

Figure 1 is a top plan view of a sheet glass conveyer in accordance with this invention.

Figure 2 is a side elevation, parts broken away and parts in section.

Figure 3 is an enlarged sectional view approximately on the line 3—3 of Figure 2.

Figure 4 is a detail side elevation of one of the flights attached to the endless chain.

Figure 5 is a sectional view approximately on the line 5—5 of Figure 3.

Figure 6 is a sectional view on the line 6—6 of Figure 3.

In carrying out my invention I contemplate the employment of a substantially rectangular frame or table of a desired size. The frame or table averages 9 x 64 ft. The top of the frame 10, is open, the sides thereof, at desired intervals, being provided with depending portions that afford feet 11, and the bottom 12 of the frame above the feet is centrally opened, as at 13. Journaled in suitable bearings between the sides of the frame 10, adjacent to the ends thereof there are transverse shafts 14 and 15, respectively. The shaft 14 is arranged in the entrance end of the conveyer and has one end extending through its bearing on one side of the frame, the said end having fixed thereon a sprocket wheel 16. Both ends of the shaft 15 pass through its bearings at the outer end of the table, one of said projecting ends having fixed thereon a sprocket wheel 17 and the other end having thereon a fixed toothed wheel 18 that is in mesh with a similar wheel on the operating motor, (not shown). The bearings for the shaft 15 are indicated for distinction by the numerals 19, and these bearings are let in openings in the sides of the frame and are slidable in such openings. The bearings 18 are adjusted by the operation of handles on screw members 20 that pass through openings in the ends of the sides, threadedly engage the openings in the bearings and are swivelly or freely mounted in the end walls provided by the openings for the bearings. The sprocket wheel 17 is arranged on the same side of the frame as is the sprocket wheel 16, and arranged between the side members of the frame there are an equal number of equidistantly spaced rollers 21. These rollers 21 have short shafts or trunnions 22 that pass through bearing openings in the sides of the frame, and the opposite ends of these shafts have fixed thereon sprocket wheels. Trained around the sprocket wheels 16 and 17 and the sprocket wheels on the trunnions 22 and the rollers adjacent thereto there are sprocket chains 23. On the same side of the frame and trained around the sprocket wheels for the intermediate rollers 21 there is a sprocket chain 24. The ends of the intermediate trunnions for the rollers on the second side of the frame, that is the side provided with the toothed wheel 18, have trained thereover sprocket chains 25, respectively. By thus connecting the shafts 14 and 15 with the rollers adjacent thereto and by connecting these rollers with the intermediate rollers in a manner as just described it will be seen that a steady rotary movement will be imparted by the shaft 15 to all of the rollers and to the shaft 14.

On the shafts 14 and 15 there are sprocket wheels around which are trained endless chains 26. Any desired number of equidistantly spaced longitudinally arranged chains 26 may be employed, and the hubs for the sprocket wheels on the said shafts are fixed thereto so that the said chains 26 are equidistantly spaced apart. These chains rest directly on the rollers 21, and by such arrangement downward yielding of the upper leads of the chains is prevented.

Fixed on the outer edges of equidistantly spaced links of the chains 26 there are substantially U-shaped brackets 27. Received in and bolted to each of the brackets 27 there is a cross sectionally U-shaped flight 28. The elements 29 that secure the flights in the brackets also secure in the said flights substantially rectangular strips 30 of asbestos or similar slightly compressible heat absorbing elements. The sheets 30 project beyond the brackets, but all of the sheets are of the same size. This is also true with respect to the brackets 28. The heat absorbing and compressible fillers, comprising the sheets 30, thus have their outer edges always maintained at the same plane to support the sheet glass thereon in a straight and in a steady manner.

Each flight 28 has its lower corners provided with extensions in the nature of fingers 31, and these fingers are received in cross sectionally U-shaped continuous guides 32 secured on the inner faces of the sides of the frame. By this arrangement downward yielding of the flights when disposed between the shafts and rollers is effectively prevented.

The conveyer can, of course, be constructed of any size to suit the convenience of the manufacturer and the movement thereof can be adjusted to right or left hand ovens or to any other kind of lehr in the manufacture of glass. The glass sheets rest on the heat absorbing slightly compressible elements 30 in a manner that will prevent the breakage, scratching and smearing of the glass and the improvement also provides a means whereby glass from inferior manufacture can be conveyed to the end of the lehr, such glass in most cases being used to some advantage. The improvement is of a simple construction and the advantages thereof will be apparent and appreciated by those skilled in the art to which the invention relates. Obviously I do not wish to be restricted to the precise details herein set forth and, therefore, it is to be understood that the invention is to be limited only to the scope of my claim.

Having described the invention, I claim:—

A glass conveyer including a substantially rectangular frame whose top is open, transverse shafts journaled in bearing openings in the ends of the frame and carrying sprocket wheels, spaced series of rollers having trunnions journaled in the sides of the frame, endless sprocket chains trained around the sprocket wheels and bearing on the rollers, the links of certain of the chains being formed with cross sectionally U-shaped brackets, cross sectionally U-shaped flights received in and secured to the brackets and said flights having their lower corners formed with finger extensions, said flights receiving therein sheets of asbestos which project through the open top portions thereof and which are secured to the flights and to the brackets, cross sectionally U-shaped continuous guides fixed to the inner faces of the frame and receiving the fingers therein and the ends of said guides being rounded and terminating inward of the shafts, and means for imparting a rotary motion to one of the shafts and for transmitting such motion to the rollers and to the remaining shafts.

In testimony whereof I affix my signature.

JULES MAYEUR, Sr.